(12) United States Patent
Geneslaw et al.

(10) Patent No.: US 12,555,672 B2
(45) Date of Patent: Feb. 17, 2026

(54) DETECTION OF LABELS IN BIOMEDICAL IMAGES

(71) Applicants: Memorial Sloan-Kettering Cancer Center, New York, NY (US); Sloan-Kettering Institute for Cancer Research, New York, NY (US); Memorial Hospital for Cancer and Allied Diseases, New York, NY (US)

(72) Inventors: Luke Geneslaw, New York, NY (US); Thomas Fuchs, New York, NY (US); Dig Vijay Kumar Yarlagadda, New York, NY (US)

(73) Assignees: Memorial Sloan-Kettering Cancer Center, New York, NY (US); Sloan-Kettering Institute for Cancer Research, New York, NY (US); Memorial Hospital for Cancer and Allied Diseases, New York, NY (US)

( * ) Notice: Subject to any disclaimer, the term of this patent is extended or adjusted under 35 U.S.C. 154(b) by 298 days.

(21) Appl. No.: 18/558,708

(22) PCT Filed: May 2, 2022

(86) PCT No.: PCT/US2022/027278
§ 371 (c)(1),
(2) Date: Nov. 2, 2023

(87) PCT Pub. No.: WO2022/235564
PCT Pub. Date: Nov. 10, 2022

(65) Prior Publication Data
US 2024/0242816 A1   Jul. 18, 2024

Related U.S. Application Data

(60) Provisional application No. 63/183,360, filed on May 3, 2021.

(51) Int. Cl.
G06K 9/00 (2022.01)
A61K 35/12 (2015.01)
(Continued)

(52) U.S. Cl.
CPC ........... G16H 30/20 (2018.01); G06T 7/0012 (2013.01); G06V 10/255 (2022.01); G06V 10/56 (2022.01);
(Continued)

(58) Field of Classification Search
CPC ........... G06K 9/00; G16H 30/20; A61K 35/12
(Continued)

(56) References Cited

U.S. PATENT DOCUMENTS

2010/0021037 A1   1/2010   Zahniser et al.
2010/0054525 A1   3/2010   Gong et al.
(Continued)

OTHER PUBLICATIONS

International Search Report and Written Opinion for PCT/US2022/027278 dated Sep. 16, 2022, 6 pages.
(Continued)

*Primary Examiner* — Seyed H Azarian
(74) *Attorney, Agent, or Firm* — Foley & Lardner LLP

(57) ABSTRACT

Presented herein are systems and methods for detecting labels in biomedical images. A computing system having one or more processors coupled with memory may identify, from a data source, a biomedical image having a first plurality of pixels in a first color representation. The computing system may convert the first plurality of pixels from the first color representation to a second color representation to generate a second plurality of pixels. The computing system may identify, from the second plurality of pixels, a subset of pixels having a color value satisfying a threshold value. The computing system may detect the biomedical image as having at least one label based at least on a number
(Continued)

of pixels in the subset of pixels satisfying a threshold count. The computing system may store, in one or more data structures, an indication for the biomedical image as having the at least one label.

16 Claims, 7 Drawing Sheets

(51) Int. Cl.
*G06T 7/00* (2017.01)
*G06V 10/20* (2022.01)
*G06V 10/56* (2022.01)
*G16H 30/20* (2018.01)

(52) U.S. Cl.
CPC ...... *G06V 2201/03* (2022.01); *G06V 2201/10* (2022.01)

(58) Field of Classification Search
USPC ....... 382/100, 103, 106, 128–134, 154, 156, 382/162, 168, 173, 181, 199, 219, 224, 382/254, 274, 167, 276, 286–291, 305, 382/312; 378/4, 21, 43
See application file for complete search history.

(56) References Cited

U.S. PATENT DOCUMENTS

| | | |
|---|---|---|
| 2011/0157410 A1 | 6/2011 | Alcazar |
| 2015/0268248 A1 | 9/2015 | Gauthier et al. |
| 2016/0232658 A1 | 8/2016 | Syeda-Mahmood |
| 2018/0321137 A1* | 11/2018 | Ismagilov ............ G01N 21/253 |
| 2019/0197362 A1* | 6/2019 | Campanella ........... G06V 10/30 |
| 2020/0043164 A1* | 2/2020 | Fuchs ................. G06F 18/2431 |
| 2021/0239595 A1* | 8/2021 | Zahniser ............ G01N 15/1433 |
| 2022/0043001 A1* | 2/2022 | Buhimschi ......... G01N 33/6839 |
| 2022/0108430 A1* | 4/2022 | Shi ........................... G06T 5/73 |
| 2024/0257293 A1* | 8/2024 | Yip .......................... G06T 7/11 |

OTHER PUBLICATIONS

Qiu et al. "Gold nanorod light scattering labels for biomedical imaging." Biomedical Optics Express 1.1 (2010): 135-142. Jul. 15, 2010 (Jul. 15, 2010) Retrieved on Aug. 20, 2022 (Aug. 20, 2022) from <https://opg.optica .org/boe/fulltext.crm?uri=boe-1-1-135&id=203854> entire document.

* cited by examiner

DETECTION OF LABELS IN BIOMEDICAL IMAGES

CROSS REFERENCE TO RELATED APPLICATIONS

The present application is a U.S. National Phase Application of International Application No. PCT/US2022/027278, filed May 2, 2022, which claims the benefit of and priority to U.S. Patent Provisional Application No. 63/183,360, titled "Detection of Labels in Biomedical Images," filed May 3, 2021, each of which is incorporated herein in its entirety by reference.

BACKGROUND

A biological sample may be obtained from a specimen or subject in a controlled environment, and an image of the biological sample may be acquired. Various data on the biological sample itself and the image may be compiled, collected, and evaluated in accordance with various bioinformatics techniques.

SUMMARY

Each digital pathology record may identify or include an image of a biological sample (e.g., a whole slide image (WSI) of a tissue sample) acquired via an imaging platform. In some cases, the biomedical image itself may include label identifying various information about the image and the biological sample. For example, the label may identify a patient identifier, anatomical part, an acquisition date, a location of acquisition, diagnosis, and other sensitive data among others. Prior to distribution of the records, the information identified in the label may have to be removed or obfuscated. Otherwise, when these biomedical images are to be shared with external entities who are not permitted access to sensitive data, records with such information may have to be excluded. Given the large number of records, it may be impractical or cumbersome to manually scrub the information from the biomedical image, especially because different imaging platforms may treat the labels differently.

One approach aimed at protecting the information of the labels on the slides may entail feature detection techniques, such as edge detection or shape detection. Edge detection may be used to recognize the boundary or a perimeter of a label from the remainder of the image. Shape detection may be used to search for shapes generally matching labels within the image. These approaches, however, may be computationally complex and time-consuming. With the size of image files themselves and the sheer number of records, such feature detection approaches may be unsuitable for label detection.

To address these and other challenges, a record service may detect when labels are present in biomedical images based on transformed color values of pixels. The record service may support multiple image file formats from various imaging platforms (e.g., Aperio™, Hamamatsu™, and 3DHISTECH™) by applying different filters to recognize the labels from the biomedical images. Upon request, the record service may extract a thumbnail image (e.g., with a width of 1,024 pixels) from the biomedical image of the digital pathology record. Once extracted, the record service may convert each pixel of the thumbnail image from a red, green, blue (RGB) space to a hue, saturation, value (HSV) space. The record service may identify a threshold value to apply for biomedical images from the imaging platform.

For each pixel, the record service may compare the V-value (also referred as lightness (L) or brightness (B)) with the identified threshold value. Labels may be darker than the surrounding portion of the biological image, and the threshold value may differ depend on the image format, type, scanner used to acquire the image, as well as the imaging platform. When a pixel satisfies (e.g., is darker) than the threshold value, the record service may identify the pixel as potentially part of the label. In contrast, when a pixel does not satisfy (e.g., is lighter), the record service may identify the pixel as not potentially part of the label. With the identification, the record service may calculate a number of contiguous pixels that are identified as part of the label, and may compare the number of pixels to a threshold number (e.g., 1,500 pixels). If the number of pixels satisfies (e.g., exceeds) the threshold number, the record service may determine the entire set of pixels as the label. In addition, the record service may prevent the transfer of the biomedical image. Otherwise, if the number does not satisfy (e.g., is less than) the threshold number, the record service may determine that the pixels do not contain the label. The record service may also permit for transferal of the biomedical image.

In this manner, the record service may use a light-weight and less computationally complex algorithm to quickly detect the biomedical image as containing or lacking label. Based on the detection of the label, the record service may automatically prevent transfer of potentially sensitive information from the biomedical images of digital pathology records. This may increase the throughput of processing of the biomedical images and may allow for more images to be accessible to a greater number of users, while avoiding provision of sensitive information. Furthermore, the scrubbing of such data from biomedical image upon request rather than for all images maintained by the record service may free up the consumption of computing resources from detecting the label. In addition, the light-weight nature of the algorithm may spend less computing resources and expend less time from processing images, compared to feature detection techniques.

Aspects of the present disclosure are directed to systems, methods, devices, and computer-readable media for detecting labels in biomedical images. A computing system having one or more processors coupled with memory may identify, from a data source, a biomedical image having a first plurality of pixels in a first color representation. The computing system may convert the first plurality of pixels from the first color representation to a second color representation to generate a second plurality of pixels. The computing system may identify, from the second plurality of pixels, a subset of pixels having a color value satisfying a threshold value. The computing system may detect the biomedical image as having at least one label based at least on a number of pixels in the subset of pixels satisfying a threshold count. The computing system may store, in one or more data structures, an indication for the biomedical image as having the at least one label.

In some embodiments, the computing system may restrict transfer of the biomedical image, responsive to detecting the biomedical image as having the at least one label. In some embodiments, the computing system may determine that the biomedical image is not maintained separately from the at least one label associated with the biomedical image. In some embodiments, the computing system may convert the first plurality of pixels from the first color representation to the second color representation, responsive to determining that the biomedical image is not maintained separately from the at least one label.

In some embodiments, the computing system may identify, based at least on a data source from which the biomedical image is received, at least one of the second color representation, the threshold value, or the threshold count. In some embodiments, the computing system may identify a second biomedical image as lacking any label based at least on a number of pixels in a subset of pixels that satisfy the threshold value not satisfying the threshold count. In some embodiments, the computing system may store, in one or more second data structures, a second indication for the second biomedical image as lacking any label.

In some embodiments, the computing system may permit transfer of a second biomedical image, responsive to identifying the second biomedical image as lacking any label. In some embodiments, the computing system may determine that a second biomedical image is separately maintained from a second label associated with the second biomedical image. In some embodiments, the computing system may permit transfer of a first file corresponding to the second biomedical image while removing a second file corresponding to the second label.

In some embodiments, the computing system may determine whether to provide the biomedical image in response to a request, based at least on the stored indication for the biomedical image. In some embodiments, the computing system may select, from a plurality of biomedical images, the biomedical image based at least on a magnification factor for the biomedical image from which to detect the at least one label. In some embodiments, the biomedical image may include a whole slide image (WSI) of a sample tissue on a slide obtained from a subject, the slide having a portion corresponding to the at least one label.

DETAILED DESCRIPTION

Following below are more detailed descriptions of various concepts related to, and embodiments of, systems and methods for detecting labels in biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes systems and methods for detecting labels in biomedical images; and Section B describes a network environment and computing environment which may be useful for practicing various embodiments described herein.

A. Systems and Methods for Detecting Labels in Biomedical Images

Figure 1:
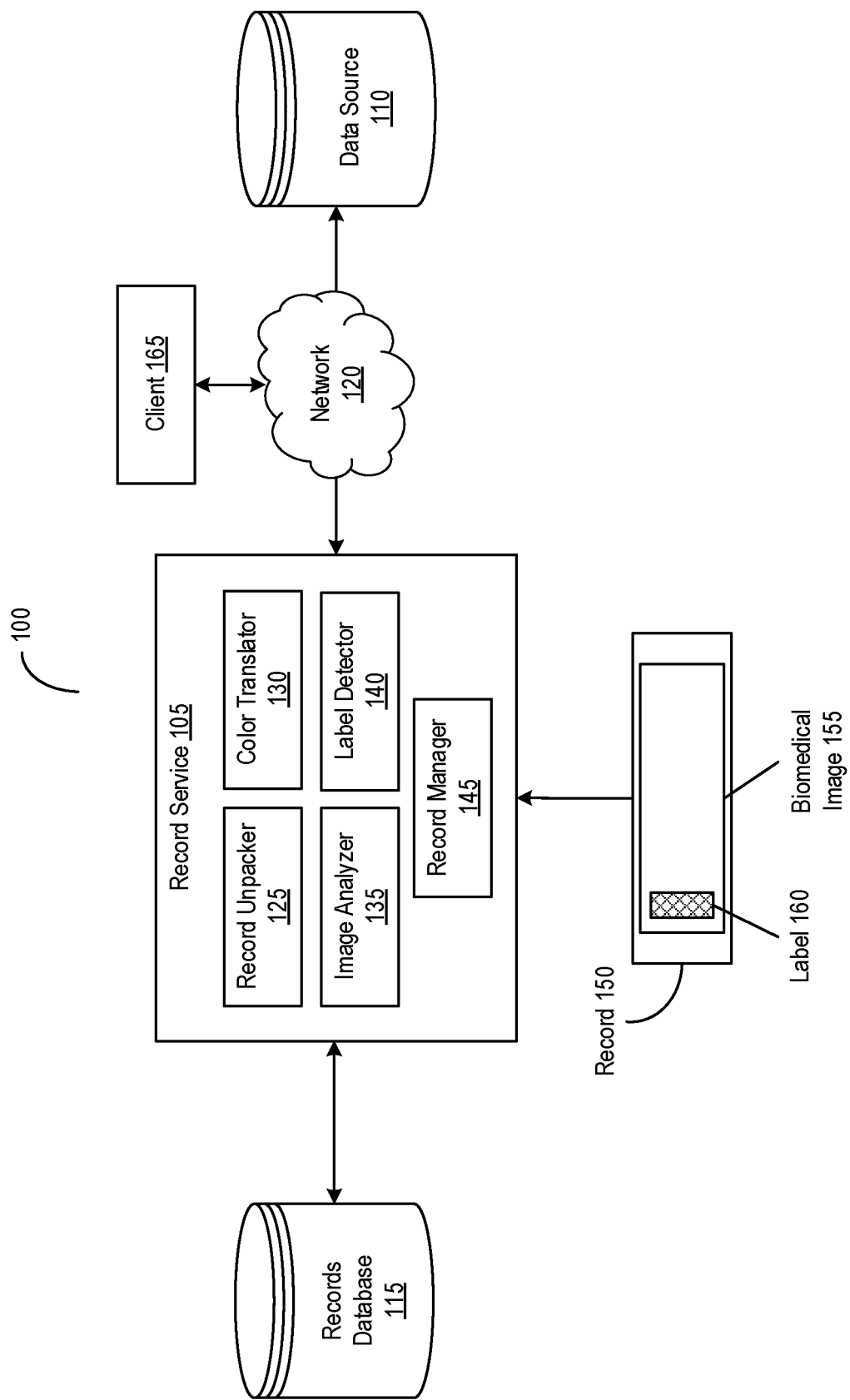
FIG. 1 is a block diagram of a system for detecting labels in biomedical images in digital pathology records in accordance with an illustrative embodiment.

Referring now to FIG. 1, depicted is a block diagram of a system 100 for detecting labels in biomedical images in digital pathology records. In overview, the system 100 may include at least one record service 105, at least one data source 110, at least one records database 115, and at least one client 165, communicatively coupled with one another via at least one network 120. The record service 105 may include at least one record unpacker 125, at least one color translator 130, at least one image analyzer 135, at least one label detector 140, and at least one record manager 145, among others. Each of the modules, units, or components in system 100 (such as the record service 105 and its components, the data source 110, and the client 165) may be implemented using hardware or a combination of hardware and software as detailed herein in Section B.

The data source 110 may acquire or generate at least one record 150 (sometimes herein referred to as a digital pathology record). The record 150 may contain, identify, or include at least one biomedical image 155. In some embodiments, the record 150 may include a set of biomedical images 155 at differing magnification factors. The biomedical image 155 may be acquired via an imaging device from a biological sample of a subject for histopathology. For instance, a microscopy camera may acquire the biomedical image 155 of a histological section corresponding to a tissue sample obtained from an organ of a subject on a glass slide stained using hematoxylin and eosin (H&E stain). The subject for the biomedical image 155 may include, for example, a human, an animal, a plant, or a cellular organism, among others. The biological sample may be from any part (e.g., anatomical location) of the subject, such as a muscle tissue, a connective tissue, an epithelial tissue, or a nervous tissue in the case of a human or animal subject. The imaging device used to acquire the biomedical image 155 may include an optical microscope, a confocal microscope, a fluorescence microscope, a phosphorescence microscope, or an electron microscope, among others The biomedical image 155 acquired by the imaging device may be in one color space representation, such as the red, green, blue (RGB) color space representation.

The record 150 acquired or generated by the data source 110 may also contain, identify, or otherwise include at least one label 160. The label 160 may include, define, or otherwise identify one or more characteristics regarding the subject from which the biological sample for the biomedical image 155 is acquired and regarding the acquisition of the biomedical image 155 from the subject. The label 160 may also be an image, and may be acquired via the imaging device used to acquire the biomedical image 155. For example, a clinician operating the imaging device may place a physical label that contains various pieces of information about the biological sample adjacent to the biological sample. Using the imaging device, the clinician may acquire both the biological sample as the biomedical image 155 and the physical label as the label 160 for the record 150. The information identified in the label 160 may include, for example: an accession number corresponding to an agreement by the subject to provide the sample; an anatomical part identifying a location from which the biological sample is taken; a patient name referring to a name of the subject from which the biological sample is taken; a medical record number to reference the subject, a slide image identifier referencing the biomedical image 155; a scanning date corresponding to a date at which the biomedical image 155 was acquired; a stain type identifying a type of stain used (e.g., hematoxylin and eosin (H&E) stain); subject traits identifying characteristics of the subject (e.g., age, race, gender, and location); and diagnosis regarding a condition of the biological sample, among others.

The data source 110 may arrange, store, or otherwise package the biomedical image 155 and the label 160 into one or more files for the record 150 in accordance with a format of the data source 110. The format for the one or more files in which the label 160 and the biomedical image 155 are stored may indicate a vendor used to generate the record 150. The vendor (and by extension, the format) used by one data source 110 may differ from the vendor used by another data source 110. In some embodiments, the label 160 and the biomedical image 155 may arranged or stored together (e.g., as one image file) in the record 150. In some embodiments, the biomedical image 155 and the label 160 may be arranged or stored separately (e.g., as separate image files) in the record 150. Upon acquisition, the data source 110 may provide, send, or otherwise transmit the record 150 to the record service 105. The record 150 may be stored and maintained on the records database 115.

Figure 2:
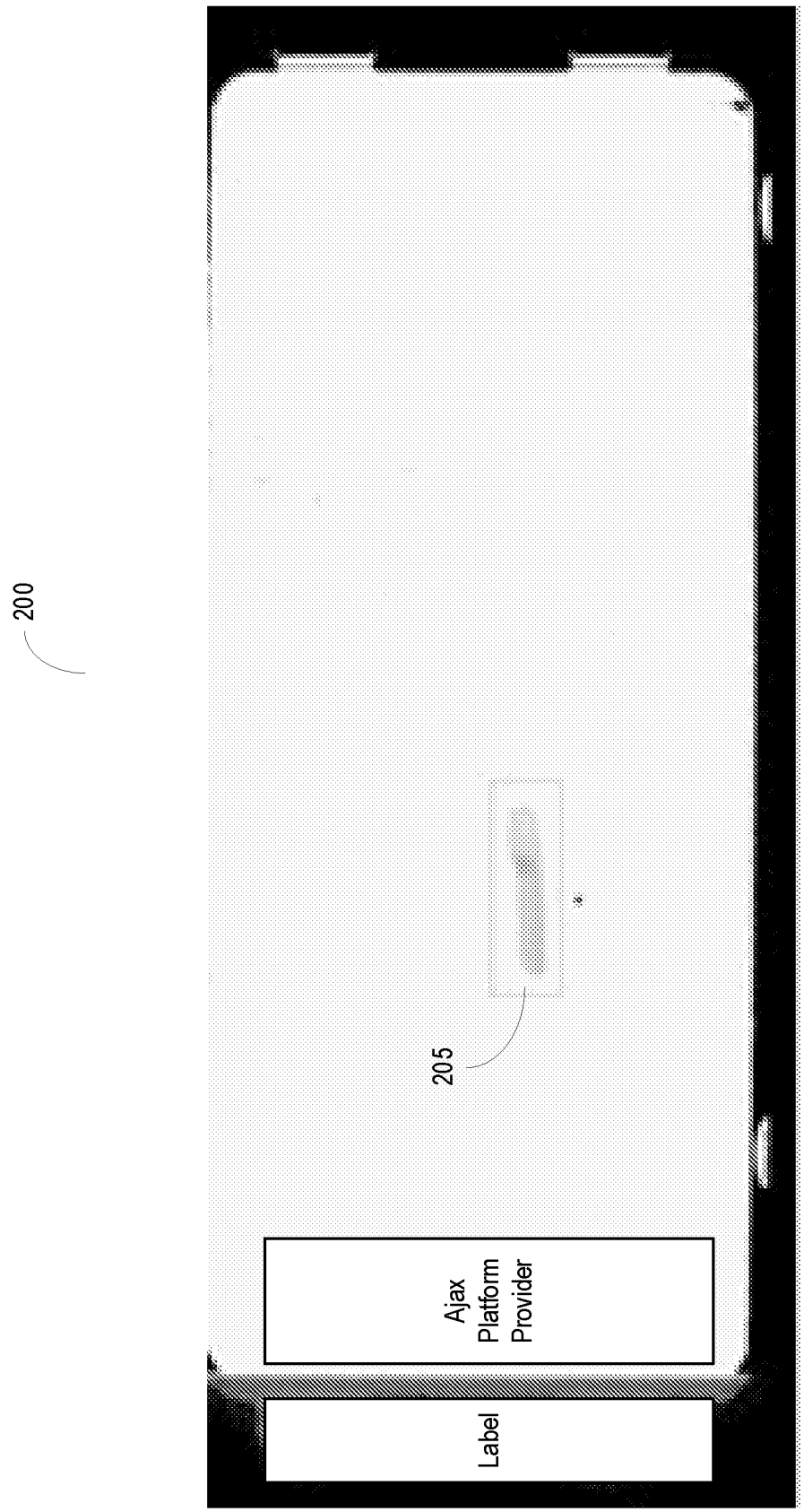
FIG. 2 is an example overview image of a glass pathology slide.

Referring now to FIG. 2, depicted is example overview image of a glass pathology slide 200, with a bounding box 205 designating the sample tissue. The image of the glass pathology slide 200 may be an example of the biomedical image 155 and the label 160. Digital pathology image files can be created by using scanning hardware from a vendor to digitize glass pathology slides. The files created may be in a variety of formats depending on the scanning hardware used, and contain both metadata and pixel data. In some embodiments, the files may contain separately scanned label and tissue images.

Figure 3A:
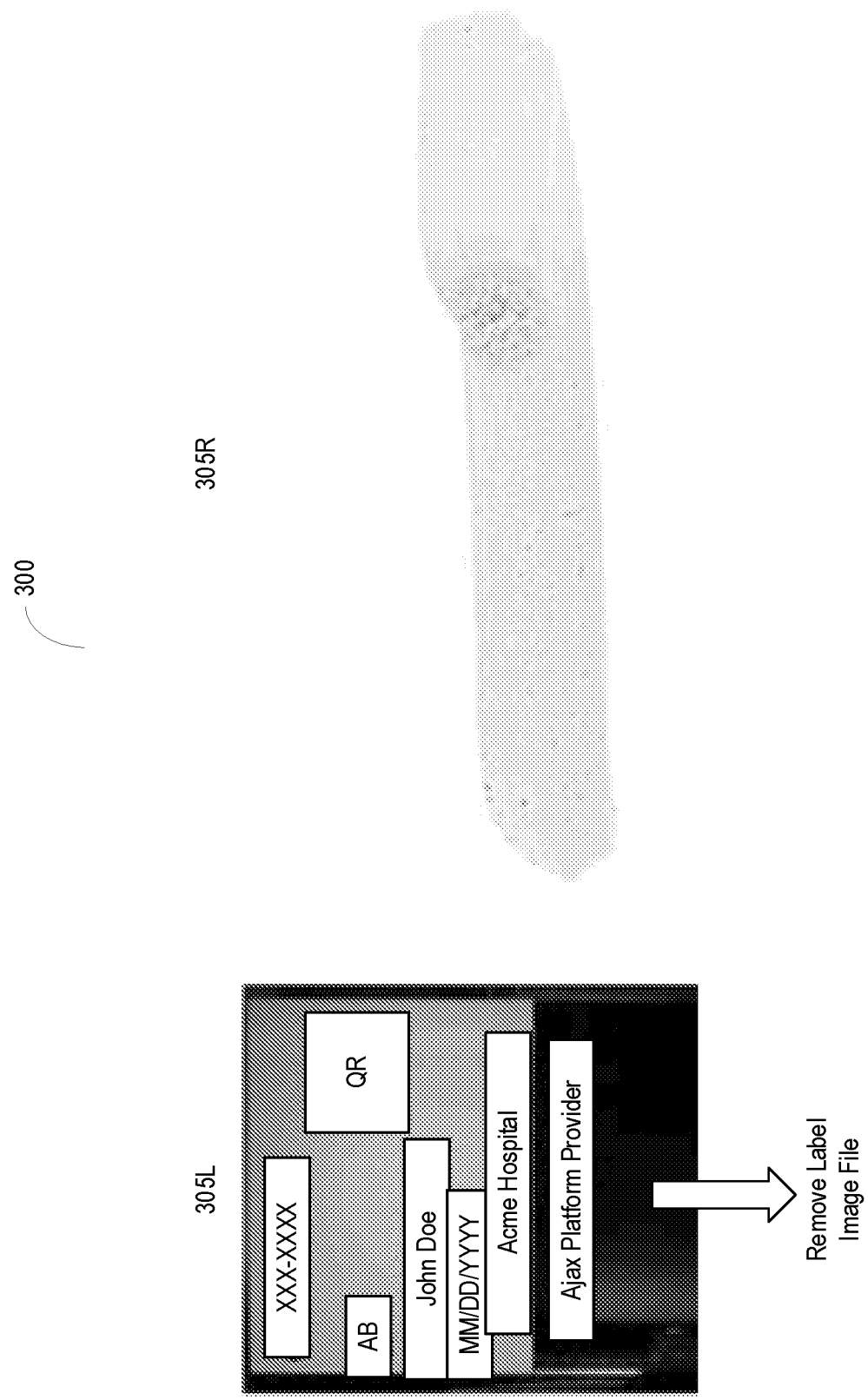
FIG. 3A is an example image with a label. The label image (left) may be captured and stored in the digital image file separately from the captured tissue image (right) which contains the region of glass where tissue can be found.
Figure 3B:
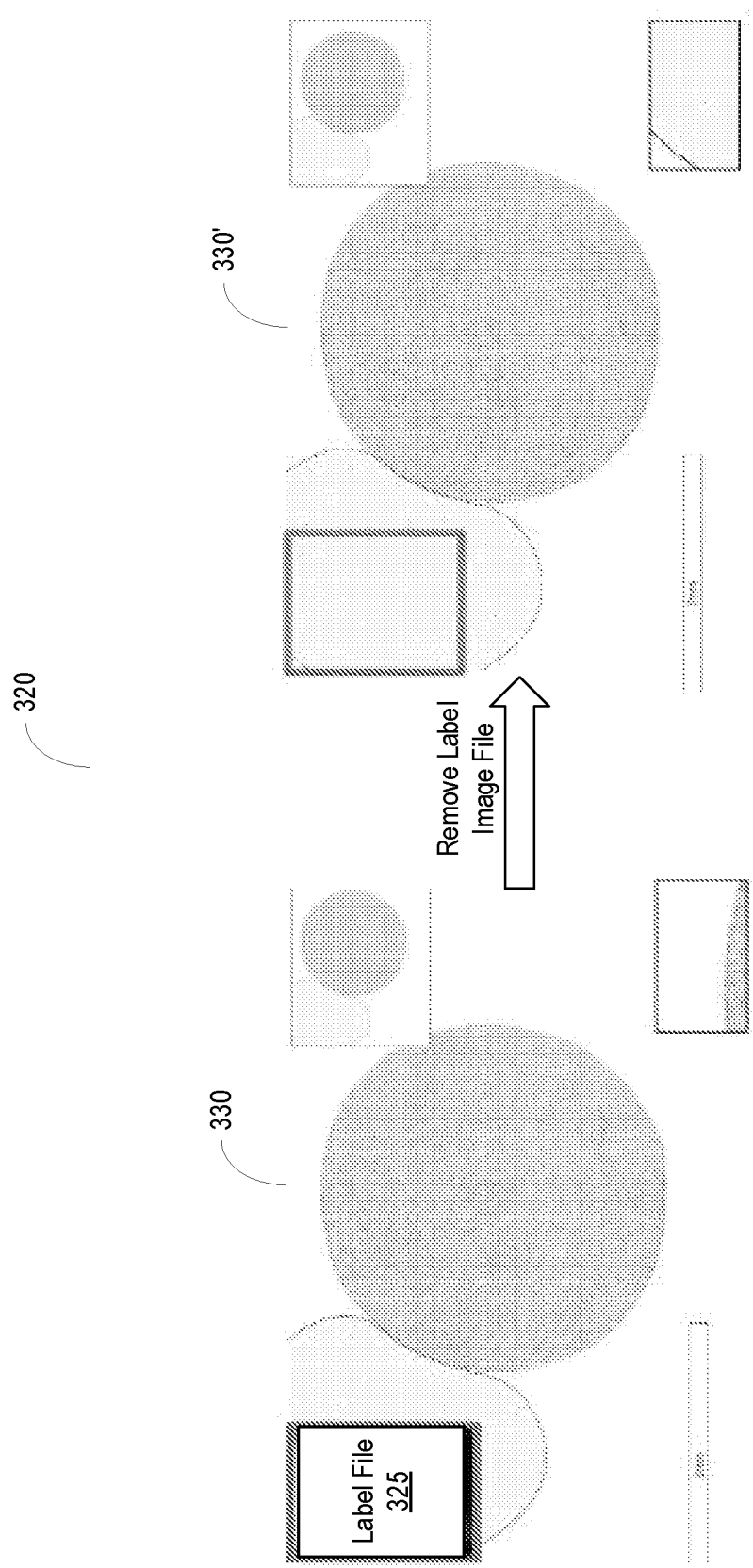
FIG. 3B is an example image with a label. The label image file and the biomedical image file may be stored separately, and the label image file may be removed.

Referring now to FIG. 3A, depicted is an image 300. The image 300 may be an example of the biomedical image 155 and the label 160. The image 300 may include a left portion 305L corresponding to the label 160 and a right portion 305R corresponding to an image of the biological sample. The entirety of the image 300 may be an example of the biomedical image 155 itself. Referring now to FIG. 3B, depicted is an example of a record 320. The record 320 may include an image file for a label 325 and a separate file for the biomedical image 330. As the image file is stored separately, the label file 325 may be removed without affecting the biomedical image 330 to form a biomedical image 330'.

Figure 4:
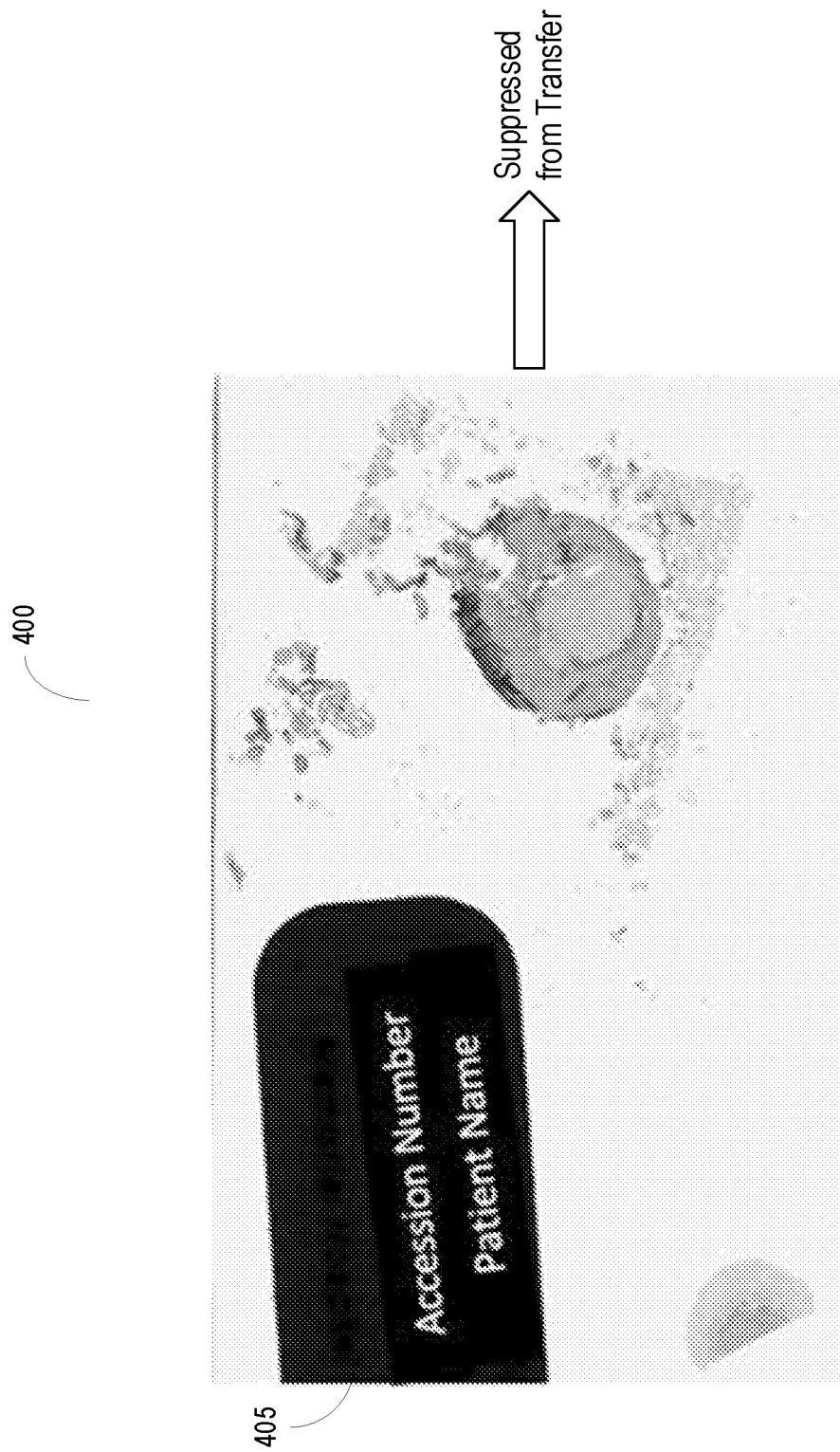
FIG. 4 is a tissue image containing a pathology slide label with visually readable protected health information (PHI)

Referring now to FIG. 4, depicted is a tissue image 400 containing a pathology slide label with visually readable protected health information (PHI). The tissue image 400 may include a portion 405 containing a scan of the physical label. The tissue image 400 may correspond to an example of the biomedical image 155, and the portion 405 may correspond to an example of the label 160. The label image may be removed from the record 150 as the label 405 displays readable protected health information (PHI). Furthermore, the record 150 containing the tissue image 400 may be suppressed from transfer (e.g., to the client 165).

Referring back to FIG. 1, the record unpacker 125 executing on the record service 105 may retrieve, receive, or otherwise identify the record 150. In some embodiments, the record unpacker 125 may receive the record 150 sent from the data source 110. In some embodiments, the record unpacker 125 may retrieve the record 150 from the records database 115. In some embodiments, the record unpacker 125 may identify the record 150 in response to a query from the client 165. The query may indicate that records 150 with specified one or more characteristics are to be retrieved for the client 165. For example, the characteristics specified in the query may identify an organ for a sample from which biomedical images 155 are acquired. Upon identifying, the record unpacker 125 may parse the record 150 to extract or identify the biomedical image 155 therefrom. In some embodiments, the record unpacker 125 may identify the data source 110 from which the record 150 originates. The record unpacker 125 may also identify the vendor or format used by the data source 110 to format or generate the record 150. The identification may be based on an extension of the one or more files storing the biomedical image 155.

In some embodiments, the record unpacker 125 may determine whether the biomedical image 155 and the label 160 are stored separately or together in the record 150 based on the one or more files of the record 150. The record unpacker 125 may identify at least one file corresponding to the label 160 and at least one file corresponding to the biomedical image 155. In some embodiments, the record unpacker 125 may identify or select one biomedical image 155 from the set of biomedical images 155 based on the magnification factor. For example, the record unpacker 125 may select the biomedical image 155, with the lowest magnification factor from the file containing the set of biomedical images 155. If the files overlap or are the same, the record unpacker 125 may determine that the biomedical image 155 and the label 160 are stored together. The record unpacker 125 may invoke other components of the record service 105 to further process the record 150. Conversely, if the files do not overlap or are not the same, the record unpacker 125 may determine that the biomedical image 155 and the label 160 are stored separately. The record unpacker 125 may further remove the file corresponding to the label 160 from the record 150. In some embodiments, the record manager 145 may permit transfer of the record 150 upon removal of the file corresponding to the label 160.

The color translator 130 executing on the record service 105 may convert pixels of the biomedical image 155 from the original color space (e.g., RGB) representation to another color space representation (e.g., a hue, saturation, value (HSV) space, hue, chroma, luminance (HCL) space, YUV model, and grayscale). The conversion of the pixels from the original color space representation to the target color space representation may be in accordance with a transfer function. In some embodiments, the color translator 130 may identify the target color space presentation to which to convert the pixels of the biomedical image 155 based on the data source 110 (or vendor) from which the biomedical image 155 is received. In some embodiments, the color translator 130 may traverse through the pixels of the biomedical image 155 to identify each pixel therein. For each pixel, the color translator 130 may identify a color value of the pixel in the original color space (e.g., RGB). Using the transfer function, the color translator 130 may calculate, determine, or generate a new value for the pixel in the target color space (e.g., HSV). The target color space may be to increase the contrast of the label 160 or further differentiation the representation of the label 160 relative to the remainder of the biomedical image 155. The color translator 130 may repeat these operations until all the pixels in the biomedical image 155 are converted to the new, target color space representation.

With the conversion, the image analyzer 135 executing on the record service 105 may categorize, identify, or otherwise classify each pixel of the biomedical image 155 as potentially a part of the label 160 or not part of the label 160. In conjunction, the image analyzer 135 may identify or select a threshold value for the particular data source 110 or the vendor or format used by the data source 110. The threshold value may delineate or define a value for the color value of the pixel in the target color space representation at which the pixel is to be classified as potentially part of the label 160 or not. The threshold value may be defined, set, or otherwise assigned based on various visual characteristics associated with labels 160. For instance, color values correlated with label 160 may be darker than color values associated with the surrounding portions in the biomedical image 155. In addition, the threshold value may differ depending on the data source 110 or the vendor or format used by the data source 110. For example, imaging devices associated with one vendor may acquire biomedical images 155 with higher brightness than other imaging devices associated with other vendors. Thus, the threshold value used for biomedical images 155 from the imaging devices associated with the vendor may be higher than the threshold value used for biomedical images 155 from other vendors.

To classify, the image analyzer 135 may identify each pixel of the biomedical image 155 in the target color space representation. For each pixel from the biomedical image 155, the image analyzer 135 may identify a color value of the pixel. With the identification, the image analyzer 135 may compare the color value of the pixel with the threshold value. When the color value satisfies (e.g., is greater than or equal to) the threshold value, the image analyzer 135 may identify or classify the pixel as potentially part (or candidate) of the label 160. In some embodiments, the image analyzer 135 may also identify a coordinate (e.g., in x and y axis) for the pixel and include the coordinate into a data structure (e.g., list) identifying pixel coordinates as potentially part of the label 160. Otherwise, when the color value does not satisfy (e.g., is less than) the threshold value, the image analyzer 135 may identify or classify the pixel as not part of the label 160. In some embodiments, the image analyzer 135 may also identify the coordinate of the pixel for the pixel and include the coordinate into a data structure identifying pixel coordinates not part of the label 160. With the identifications, the image analyzer 135 may identify a subset of pixels (and pixel coordinates) in the biomedical image 155 classified as potentially part of the label 160 from the biomedical image 155. In addition, the image analyzer 135 may identify a subset of pixels (and pixel coordinates) classified as not part of the label 160 from the biomedical image 155.

Using the classifications of the pixels in the biomedical image 155, the label detector 140 executing on the record service 105 may determine whether the subset of pixels classified as potentially part of the label 160. In some embodiments, the label detector 140 may determine whether the subset of pixels corresponds to the label 160. In some embodiments, the label detector 140 may determine whether the biomedical image 155 contains the label 160. In some embodiments, the label detector 140 may identify a contiguous subset of pixels classified as potentially part of the label 160 based on the pixel coordinates. With the identification of the subset, the label detector 140 may count, determine, or otherwise identify a number of pixels in the subset of pixels classified as potentially part of the label 160. Based on the number of pixels, the label detector 140 may classify or determine whether the identified subset of pixels corresponds to the label.

In determining, the label detector 140 may compare the number of pixels with a threshold number. The threshold number may delineate or define a value (e.g., 1500 pixels) for the number of pixels at which the corresponding subset of pixels is determined to be the label 160. In some embodiments, the threshold number may also differ depending on the data source 110 or the vendor or format used by the data source 110. For example, the threshold number may be dependent on the resolution (e.g., number of pixels) used by the scanner of the data source 110 to acquire the biomedical image 155.

When the number of pixels does not satisfy (e.g., is less than) the threshold number, the label detector 140 may determine that the subset of pixels is not the label 160. Conversely, when the number of pixels satisfies (e.g., is greater than or equal to) the threshold number, the label detector 140 may determine that the subset of pixels is the label 160. Based on the determination of whether the subset of pixels is the label 160, the label detector 140 may determine whether the biomedical image 155 includes or contains the label 160. When the subset of pixels is determined to be the label 160, the label detector 140 may determine that the biomedical image 155 contains the label 160. In some embodiments, the label detector 140 may store and maintain an indicator identifying the biomedical image 155 as containing the label 160. The indicator may be in the form of at least one data structure, such as arrays, linked lists, heaps, tables, and trees, among others. On the other hand, when the subset of pixels is determined to be the label 160, the label detector 140 may determine that the biomedical image 155 does not contain the label 160. In some embodiments, the label detector 140 may store and maintain an indicator identifying the biomedical image 155 as lacking the label 160.

The record manager 145 may control transfer of the record 150 from the records database 115 to the network 120 (e.g., to the client 165 that sent a query for records). Based on the determination as to whether the biomedical image 155 contains the label 160, the record manager 145 may determine whether to permit or restrict transfer of the record 150. The determination may be in response to a request for particular biomedical images 155. When the biomedical image 155 is determined to include the label 160, the record manager 145 may restrict transfer of the record 150 including the biomedical image 155 with the label 160. For example, the record manager 145 may block communication of the record 150 when requested by the client 165. In some embodiments, the record manager 145 may include, add, or otherwise store an indicator (e.g., a flag) identifying that the record 150 is to be restricted from transferal. The indicator may be stored in the form of at least one data structure, such as arrays, linked lists, heaps, tables, and trees, among others. On the other hand, when the biomedical image 155 is not determined to include the label 160, the record manager 145 may permit transfer of the record 150. For instance, the record manager 145 may allow communication of the record 150 when requested by the client 165. In some embodiments, the record manager 145 may include, add, or otherwise store an indicator (e.g., a flag) identifying that the record 150 is to be permitted for transferal.

In some embodiments, the record manager 145 may also create or generate an indication specifying that the record 150 is permitted to be transferred. The indication may be associated with the record 150, and may be stored and maintained on the records database 115 using one or more data structures. The indication may be associated with the record 150, and may be stored and maintained on the records database 115. The data structures may include arrays, linked lists, heaps, tables, and trees, among others. Using the indication, the record manager 145 may determine whether to permit or restrict the transfer of the biomedical image 155 when a request for images is received. For instance, the record manager 145 may maintain an identifier in a table for a file corresponding to the record 150 and include another identifier in the table indicating that the record 150 is to be restricted or permitted. There may be one data structure (e.g., a Boolean variable) indicating restriction and another data structure (e.g., another Boolean variable) indicating permission for transferal of the respective record 150.

In response to the query, the record manager 145 may provide, send, or otherwise transmit a set of records 150 identified as permitted to be transferred to the client 165 from which the query is received. The set of records 150 may identify or include the biomedical images 155 with the characteristics as specified in the query. In some embodiments, the record manager 145 may provide the files corresponding to the records 150 to the client 165. For example, the record manager 145 may package the files corresponding to the records 150 identified as permitted to be transferred into a compressed file. The record manager 145 may provide the compressed file to the client 165. In some embodiments, the record manager 145 may provide identifiers corresponding to the records 150 identified as permitted for transferal. The identifier may be, for example, a uniform resource locator (URL) referencing the file corresponding to the respective record 150. The client 165 may in turn receive the set of records 150 from the record service 105. The client 165 may render or present at least one biomedical image 155 from the set of records 150.

By using a light-weight and less computationally complex algorithm, the record servicer 105 may quickly detect the biomedical image 155 as containing or lacking labels 160. Relative to techniques reliant on computationally complex algorithms such as feature detection, the operations carried out by the record service 105 may spend less computational resources and spend less amount of time in processing the biomedical images 155. In addition the record service 105 may also more quickly determine whether to allow or prevent the transfer of potentially sensitive information from the records database 115. This may increase the throughput of processing biomedical images 155 and allow for more biomedical images 155 and records 150 to be accessible to a greater number of users, while avoiding provision of sensitive information.

Figure 5:
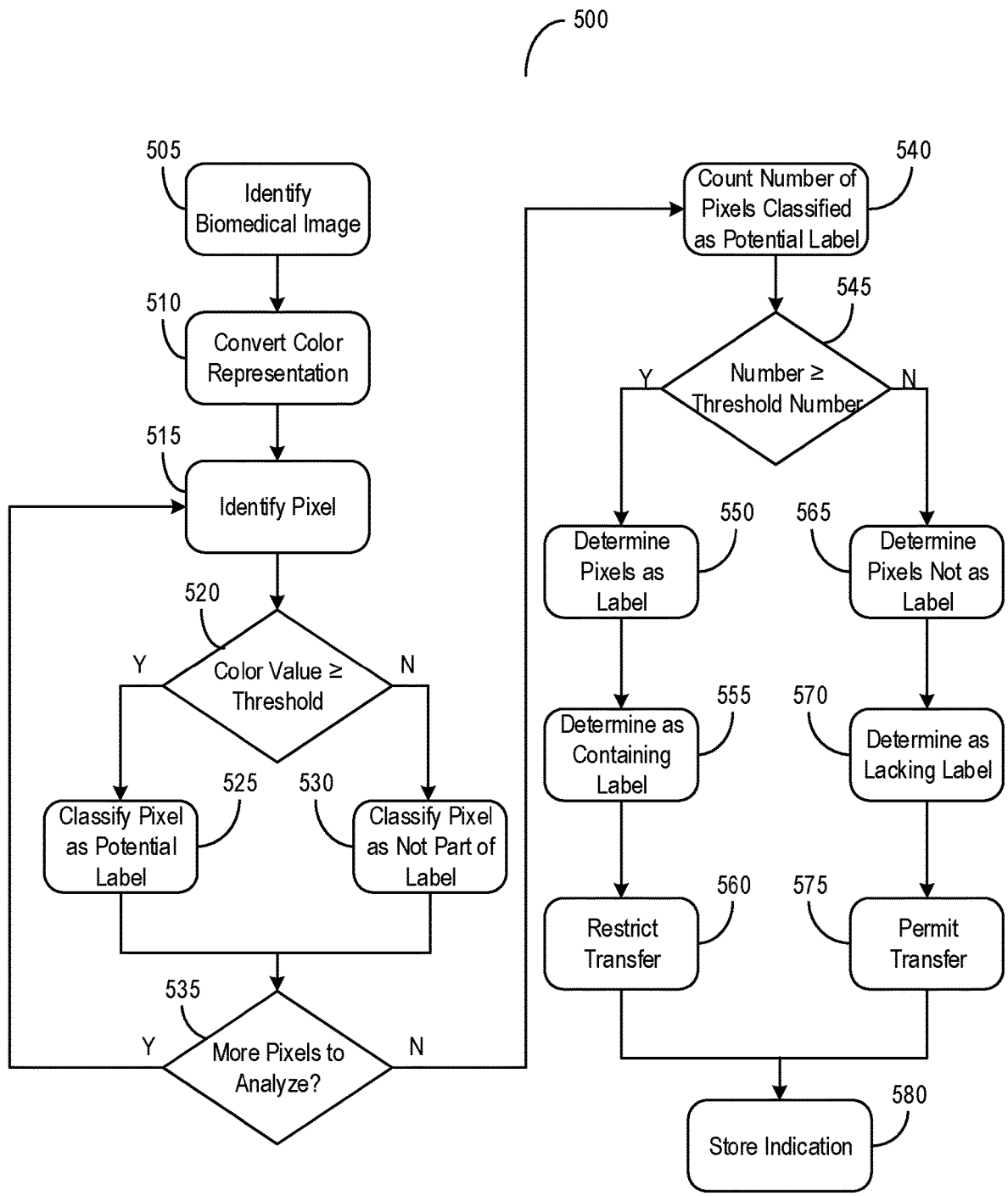
FIG. 5 is a flow diagram of a method of for detecting labels in biomedical images in digital pathology records in accordance with an illustrative embodiment.

Referring now to FIG. 5, depicted is a flow diagram of a method 500 of detecting labels in biomedical images in digital pathology records. The method 500 may be implemented using or performed by any of the components in the system 100 as detailed herein in conjunction with FIGS. 1-4 or the computing system 600 as described herein in conjunction with FIG. 6. In method 500, a computing system may identify a biomedical image (505). The computing system may convert a color representation (510). The computing system may identify a pixel (515). The computing system may determine whether a color value is greater than or equal to a threshold (520). If the color value is greater than or equal to the threshold, the computing system may classify the pixel as potentially part of a label (525). Otherwise, if the color value is less than the threshold, the computing system may classify the pixel as not part of the label (530). The computing system may determine whether more pixels are to be analyzed (535). If none, the computing system may count a number of pixels classified as potentially part of the label (530). The computing system may determine whether the number is greater than or equal to a threshold number (535). If the number of pixels is greater than or equal to the threshold, the computing system may determine the pixels as the label (550). The computing system may also determine that the biomedical image contains the label (555). The computing system may further restrict transfer of the biomedical image (560). Conversely, if the number of pixels is less than the threshold, the computing system may determine the pixels as not the label (565). The computing system may determine that the biomedical image lacks the label (570). The computing system may further permit transfer of the biomedical image (575). The computing system may store an indication of the determination for the biomedical image (580).

B. Computing and Network Environment

Figure 6:
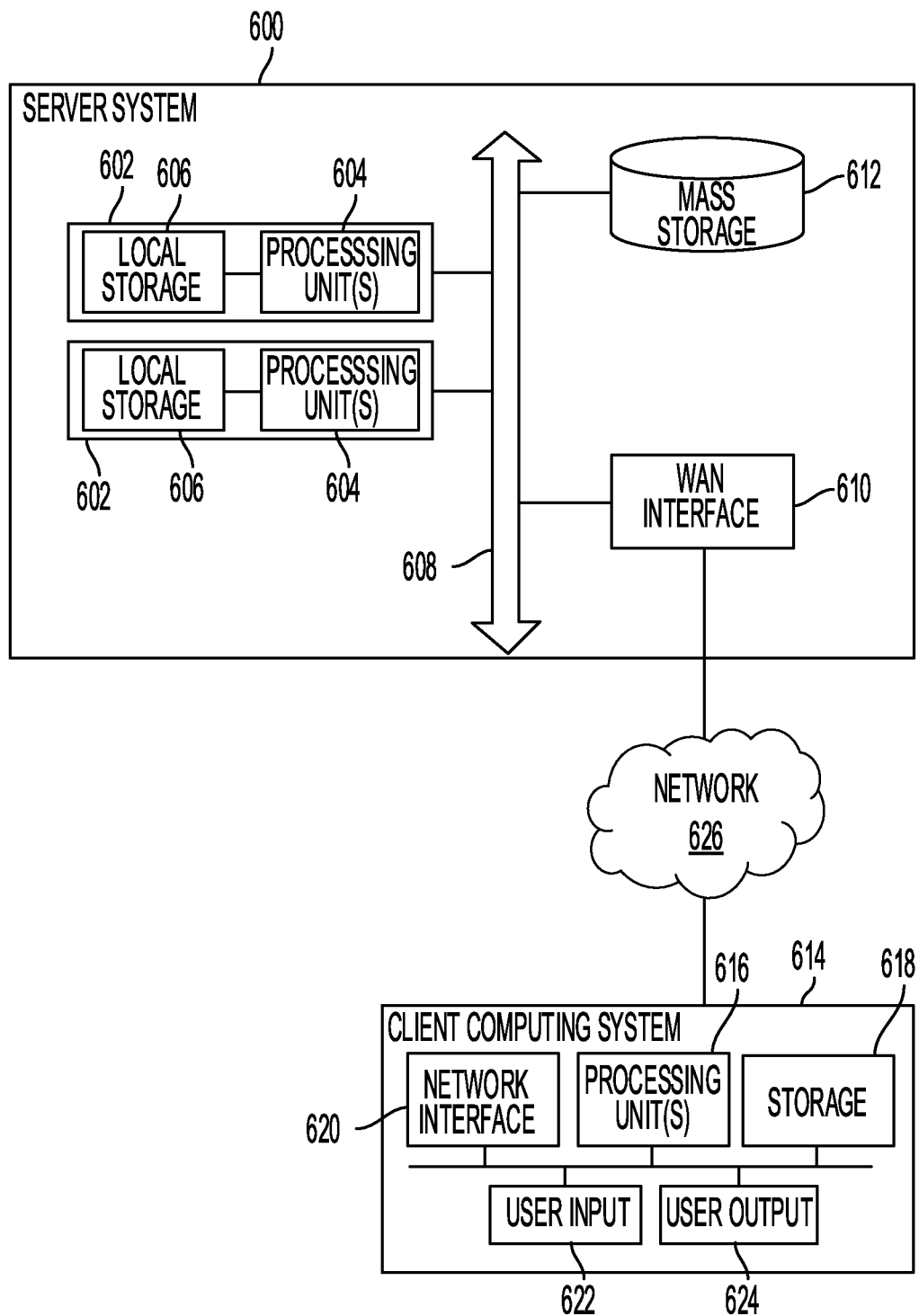
FIG. 6 is a block diagram of a server system and a client computer system in accordance with an illustrative embodiment.

Various operations described herein can be implemented on computer systems. FIG. 6 shows a simplified block diagram of a representative server system 600, client computer system 614, and network 626 usable to implement certain embodiments of the present disclosure. In various embodiments, server system 600 or similar systems can implement services or servers described herein or portions thereof. Client computer system 614 or similar systems can implement clients described herein. The system 100 described herein can be similar to the server system 600. Server system 600 can have a modular design that incorporates a number of modules 602 (e.g., blades in a blade server embodiment); while two modules 602 are shown, any number can be provided. Each module 602 can include processing unit(s) 604 and local storage 606.

Processing unit(s) 604 can include a single processor, which can have one or more cores, or multiple processors. In some embodiments, processing unit(s) 604 can include a general-purpose primary processor as well as one or more special-purpose co-processors such as graphics processors, digital signal processors, or the like. In some embodiments, some or all processing units 604 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 604 can execute instructions stored in local storage 606. Any type of processors in any combination can be included in processing unit(s) 604.

Local storage 606 can include volatile storage media (e.g., DRAM, SRAM, SDRAM, or the like) and/or non-volatile storage media (e.g., magnetic or optical disk, flash memory, or the like). Storage media incorporated in local storage 606 can be fixed, removable or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 604 need at runtime. The ROM can store static data and instructions that are needed by processing unit(s) 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 606 can store one or more software programs to be executed by processing unit(s) 604, such as an operating system and/or programs implementing various server functions such as functions of the system 100 of FIG. 1 or any other system described herein, or any other server(s) associated with system 100 or any other system described herein.

"Software" refers generally to sequences of instructions that, when executed by processing unit(s) 604 cause server system 600 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 604. Software can be implemented as a single program or a collection of separate programs or program modules that interact as desired. From local storage 606 (or non-local storage described below), processing unit(s) 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies including server racks, hubs, routers, etc.

A wide area network (WAN) interface 610 can provide data communication capability between the local area network (interconnect 608) and the network 626, such as the Internet. Technologies can be used, including wired (e.g., Ethernet, IEEE 802.3 standards) and/or wireless technologies (e.g., Wi-Fi, IEEE 802.11 standards).

In some embodiments, local storage 606 is intended to provide working memory for processing unit(s) 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. In some embodiments, additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Work allocation techniques can be used. As requests are processed, results can be returned to the requester via WAN interface 610. Such operation can generally be automated. Further, in some embodiments, WAN interface 610 can connect multiple server systems 600 to each other, providing scalable systems capable of managing high volumes of activity. Other techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 6 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include computer components such as processing unit(s) 616, storage device 618, network interface 620, user input device 622, and user output device 624. Client computing system 614 can be a computing device implemented in a variety of form factors, such as a desktop computer, laptop computer, tablet computer, smartphone, other mobile computing device, wearable computing device, or the like.

Processor 616 and storage device 618 can be similar to processing unit(s) 604 and local storage 606 described above. Suitable devices can be selected based on the demands to be placed on client computing system 614; for example, client computing system 614 can be implemented as a "thin" client with limited processing capability or as a high-powered computing device. Client computing system 614 can be provisioned with program code executable by processing unit(s) 616 to enable various interactions with server system 600.

Network interface 620 can provide a connection to the network 626, such as a wide area network (e.g., the Internet) to which WAN interface 610 of server system 600 is also connected. In various embodiments, network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or information. In various embodiments, user input device 622 can include any or all of a keyboard, touch pad, touch screen, mouse or other pointing device, scroll wheel, click wheel, dial, button, switch, keypad, microphone, and so on.

User output device 624 can include any device via which client computing system 614 can provide information to a user. For example, user output device 624 can include a display to display images generated by or delivered to client computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 624 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 604 and 616 can provide various functionality for server system 600 and client computing system 614, including any of the functionality described herein as being performed by a server or client, or other functionality.

It will be appreciated that server system 600 and client computing system 614 are illustrative and that variations and modifications are possible. Computer systems used in connection with embodiments of the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A system for detecting labels in biomedical images, comprising:
   a computing system having one or more processors coupled with memory, configured to:
   identify a first biomedical image having a first plurality of pixels in a first color representation, the first biomedical image a whole slide image (WSI) of a sample tissue on a slide;
   convert the first plurality of pixels from the first color representation to a second color representation to generate a second plurality of pixels;
   identify, from the second plurality of pixels, a first subset of pixels having a color value satisfying a threshold value;
   detect the first biomedical image as having at least one label based at least on a first number of pixels in the first subset of pixels satisfying a threshold count;
   store, in one or more first data structures, a first indication for the first biomedical image as having the at least one label;
   identify a second biomedical image as lacking any label based at least on a second number of pixels in a second subset of pixels that satisfy the threshold value not satisfying the threshold count;
   store, in one or more second data structures, a second indication for the second biomedical image as lacking any label; and
   permit transfer of a second biomedical image, responsive to identifying the second biomedical image as lacking any label.

2. The system of claim 1, wherein the computing system is further configured to restrict transfer of the first biomedical image, responsive to detecting the first biomedical image as having the at least one label.

3. The system of claim 1, wherein the computing system is further configured to:
   determine that the first biomedical image is not maintained separately from the at least one label associated with the first biomedical image
   convert the first plurality of pixels from the first color representation to the second color representation, responsive to determining that the first biomedical image is not maintained separately from the at least one label.

4. The system of claim 1, wherein the computing system is further configured to identify, based at least on a data source from which the first biomedical image is received, at least one of the second color representation, the threshold value, or the threshold count.

5. The system of claim 1, wherein the computing system is further configured to:
   determine that the second biomedical image is separately maintained from a second label associated with the second biomedical image; and
   permit transfer of a first file corresponding to the second biomedical image while removing a second file corresponding to the second label.

6. The system of claim 1, wherein the computing system is further configured to determine whether to provide the first biomedical image in response to a request, based at least on the first indication for the first biomedical image.

7. The system of claim 1, wherein the computing system is further configured to select, from a plurality of biomedical images, the first biomedical image based at least on a magnification factor for the first biomedical image from which to detect the at least one label.

8. The system of claim 1, wherein the WSI is acquired in accordance with microscopy, wherein the sample tissue is obtained from an anatomical location of a subject, wherein the slide has a portion corresponding to the at least one label.

9. A method of detecting labels in biomedical images, comprising:
   identifying, by a computing system, a first biomedical image having a first plurality of pixels in a first color representation, the first biomedical image a whole slide image (WSI) of a sample tissue on a slide;
   converting, by the computing system, the first plurality of pixels from the first color representation to a second color representation to generate a second plurality of pixels;
   identifying, by the computing system, from the second plurality of pixels, a first subset of pixels having a color value satisfying a threshold value;
   detecting, by the computing system, the first biomedical image as having at least one label based at least on a first number of pixels in the first subset of pixels satisfying a threshold count;
   storing, by the computing system, in one or more first data structures, a first indication for the first biomedical image as having the at least one label;
   identifying, by the computing system, a second biomedical image as lacking any label based at least on a second number of pixels in a second subset of pixels that satisfy the threshold value not satisfying the threshold count;
   storing, by the computing system, in one or more second data structures, a second indication for the second biomedical image as lacking any label; and
   permitting, by the computing system, transfer of a second biomedical image, responsive to identifying the second biomedical image as lacking any label.

10. The method of claim 9, further comprising restricting, by the computing system, transfer of the first biomedical image, responsive to detecting the first biomedical image as having the at least one label.

11. The method of claim 9, further comprising determining, by the computing system, that the first biomedical image is not maintained separately from the at least one label associated with the first biomedical image, and
   wherein converting further comprises converting the first plurality of pixels from the first color representation to the second color representation, responsive to determining that the first biomedical image is not maintained separately from the at least one label.

12. The method of claim 9, further comprising identifying, by the computing system, based at least on a data source from which the first biomedical image is received, at least one of the second color representation, the threshold value, or the threshold count.

13. The method of claim 9, further comprising:
   determining, by the computing system, that the second biomedical image is separately maintained from a second label associated with the second biomedical image; and
   wherein permitting the transfer further comprises permitting the, transfer of a first file corresponding to the second biomedical image while removing a second file corresponding to the second label.

14. The method of claim 9, further comprising determining, by the computing system, whether to provide the first biomedical image in response to a request, based at least on the first indication for the first biomedical image.

15. The method of claim 9, wherein identifying the first biomedical image further comprises selecting, from a plurality of biomedical images, the first biomedical image based at least on a magnification factor for the first biomedical image from which to detect the at least one label.

16. The method of claim 9, wherein the WSI is acquired in accordance with microscopy, wherein the sample tissue obtained from a subject, wherein the slide has a portion corresponding to the at least one label.

* * * * *